United States Patent
Crawford

Patent Number: 5,230,761
Date of Patent: Jul. 27, 1993

[54] WAISTBAND INTERLINING WITH THIN EDGES AND ITS ULTRASONIC FORMATION

[75] Inventor: Warren N. Crawford, Lincolnwood, Ill.

[73] Assignee: QST Industries, Inc., Chicago, Ill.

[21] Appl. No.: 970,988

[22] Filed: Nov. 2, 1992

Related U.S. Application Data

[63] Continuation of Ser. No. 765,393, Sep. 20, 1991, abandoned, which is a continuation of Ser. No. 565,906, Aug. 10, 1990, abandoned, which is a continuation of Ser. No. 434,600, Nov. 10, 1989, abandoned, which is a continuation of Ser. No. 287,617, Dec. 16, 1988, abandoned, which is a continuation of Ser. No. 930,708, Nov. 13, 1986, abandoned, which is a continuation-in-part of Ser. No. 884,378, Jul. 11, 1986, abandoned, and Ser. No. 735,236, May 7, 1985, abandoned.

[30] Foreign Application Priority Data

May 21, 1984 [GB] United Kingdom ............... 8412911

[51] Int. Cl.⁵ .................................. D06C 25/00
[52] U.S. Cl. ................... 156/73.3; 156/73.2; 156/88; 156/515; 156/580.2; 264/23; 428/192; 428/254; 428/267
[58] Field of Search ........ 156/73.1, 73.2, 73.3, 156/88, 515, 580.1, 580.2; 264/23; 428/192, 254, 265, 267

[56] References Cited

U.S. PATENT DOCUMENTS

| | | | |
|---|---|---|---|
| 1,356,890 | 10/1920 | Smith | 156/88 |
| 2,628,412 | 2/1953 | Vera | 156/88 |
| 2,886,481 | 5/1959 | Swan | 156/88 |
| 3,378,429 | 4/1968 | Obeda | 156/580.2 |
| 3,531,365 | 9/1970 | Melin | 428/265 |
| 3,841,952 | 10/1974 | Kimura et al. | 428/267 |
| 3,961,125 | 6/1976 | Suminokura et al. | 428/265 |
| 4,097,327 | 6/1978 | Calemard | 156/580.2 |
| 4,428,995 | 1/1984 | Yokono et al. | 156/88 |
| 4,455,342 | 6/1984 | Fink et al. | 428/265 |
| 4,534,819 | 8/1985 | Payet et al. | 156/73.3 |

*Primary Examiner*—W. Gary Jones
*Assistant Examiner*—Todd J. Burns
*Attorney, Agent, or Firm*—Eugene F. Friedman

[57] ABSTRACT

Waistband interlinings are made by ultrasonically cutting a fabric having warp yarns and fill yarns of a thermoplastics material along lines parallel to the warp threads. An acrylic finish on the fabric permits it to undergo the ultrasonic cutting, will retard the development of brittleness in the fused fibres, and keep the resulting fused edge intact. The fabric should have at least 30 fill yarns per inch but no more than 42 warp yarns per inch. The fabric is cut by passing it between a stationary pressing element, or knife, and the horn of an ultrasonic generator. The fill yarns melt as they pass between the knife and the horn and fuse into adjacent fill threads to form a continuous edge along the length of the cut fabric. The resulting waistband material has a smooth edge formed from fill, or weft, fibres fused to each other and to not more than one warp thread. The waistband interlining finds use in a waistband assembly for slacks and pants.

41 Claims, 3 Drawing Sheets

WAISTBAND INTERLINING WITH THIN EDGES AND ITS ULTRASONIC FORMATION

REFERENCE TO RELATED APPLICATIONS

This is a continuation of application Ser. No. 07/765,393, filed Sep. 20, 1991, now abandoned which is a continuation of the U.S. application Ser. No. 07/565,906, filed Aug. 10, 1990, now abandoned which is a continuation of the U.S. application Ser. No. 07/434,600, filed Nov. 10, 1989, now abandoned which is a continuation of the U.S. application Ser. No. 07/287,617, filed Dec. 16, 1988, now abandoned which was a continuation of the U.S. application Ser. No. 06/930,708, filed Nov. 13, 1986, now abandoned which was a continuation-in-part of the U.S. application Ser. No. 06/735,236, filed May 17, 1985, now abandoned and 06/884,378, filed Jul. 11, 1986 now abandoned.

BACKGROUND

The invention is concerned with the production of waistband interlinings.

It is conventional to produce waistband interlinings by cutting strips of appropriate length from relatively wide, continuous lengths of woven or nonwoven material. The interlinings are suitably cut from fill width piece goods in the wrap direction by cold shearing or by the use of a hot knife.

A disadvantage associated with this method of producing interlinings is that the cut edges of the fabric are rough. In the case of hot cutting a strip containing nylon or other thermoplastics material in the weft, or fill the edges become even more rough and brittle. When such a strip is inserted wholly or partially around the garment waistband, the weft threads, normally monofilaments, tend to protrude through the waistband shell fabric and may cause irritation to the wearer. When the interlining is a strip woven on a narrow loom, the return bights of the weft, i.e. the selvedge, tend to break, with the same undesirable protrusion of points which may penetrate the shell waistband fabric, abrade the same, and cause irritation to the wearer.

These disadvantages are overcome to a considerable extent by the process described in U.K. Patent Specification 1,213,957, (and U.S. Pat. No. 3,571,814) according to which a continuous bead is applied to each cut edge of the interlining. One method for applying the continuous bead described in Patent Specification 1,213,957 comprises continuously extruding a plastics composition onto the moving interlining strip. The continuous bead forms a finished edge which prevents the needle-like ends of the weft threads from penetrating or abrading the waistband shell fabric. This prevents the displacement of the weft threads. The material of the bead flows into the interstices of the interlining strip to unite the bead, wrap, and fills into an integrated whole.

While the method of the above-mentioned Specification works well, the production of an interlining strip in accordance with that method from a full-width fabric involves two distinct operations, namely cutting the strip from the full width piece goods and then extruding the edge bead onto it. It is an object of the present invention to provide a method of producing a waistband interlining having a "smooth edge" wherein the cutting of the interlining strip and the provision of smooth edges thereon are carried out in a single operation.

In its simplest form, the invention involves the melting of the fill yarns and the fusing or "smearing" of their molten ends into each other to form a continuous edge. Additional, the molten fill ends may also fuse with one adjacent warp, at least in places. Preferably, the fill ends do not fuse with any warp threads.

In general terms, the waistband interlining material comprises an elongated web of resilient, stiff woven fabric. The fabric has at least about 30 fill yarns of thermoplastic material per inch and no more than about 42 warp yarns of a high thermoplastic content per inch. The ends of the fill yarns at the elongated edge of the web have undergone fusing to each other and no more than one of the warp yarns.

The fabric of the waistband material incorporates a finishing on the woven warp and fill yarns. This finish typically takes the form of a thermoplastic material added, in a molten state, to the yarns and allowed to cool into a solid mass. An acrylic resin represents a convenient type of finish.

The finish on the fabric generally facilitates or even permits the formation of a fused, solid mass on the elongated edge of the web of fabric of the waistband material. This may result from the finish itself acting as a sort of adhesive to hold the yarns together during the fusion process to insure a solid continuum of thermoplastic material. Alternately, the application of the finish may serve as a tempering process on the yarns to make them more amenable to the ultrasonic fusing process.

The elongated edges on the web then form a fused, smooth mass formed from the ends of the fill yarns along the elongated edge. The fused mass may include all or part of one of the warp yarns. In the prefered case, however, the edge will result from the fusion of only the ends of the fills and will not include any material from the warp yarns.

Limiting the involvement of the fused edge to one and preferably no warp yarns results in the utilization of a simpler manufacturing process and equipment. To involve more than one warp yarns requires additional energy to provide the required fused mass.

Further, involving one or no warp yarns produces a smaller, smooth edge which has a width no greater than that of the fabric itself. Furthermore, avoiding the involvement of a plurality of yarns results in the removal of less of the original woven fabric from the final product; less of it disappears by melting under the ultrasonic knife.

Additionally, avoiding the involvement of many yarns into the edge provides a less expensive manufacturing process. The material may move through the ultrasonic cutter faster. Further, removing less product permits the greater utilization of the original fabric.

Moreover, the resulting interlining, with the thin fused edge, appears less likely to crack since it has greater pliability. Further, it allows the interlining to better retain its shape from one edge to the other since the fusing has had less of an effect upon the fill yarns.

A waistband assembly will then include a shell fabric of a garment such as a pair of slacks having an inwardly folded edge. A resilient woven textile strip as described above sits positioned within the fold of the shell fabric.

The warp of the woven strip will have a high thermoplastic content and often includes no more than 42, and preferably 40, yarns per inch. The warp may include 20.5 one hundred percent polyester spun yarn.

The fill, running transverse to the warps, includes relatively stiff thermoplastic monofilament yarns and at least one smooth edge which has a position adjacent to the fold in the shell fabric. The fill will typically display approximately 30, 33 or more picks per inch. The fill may have a composition of polyester or of nylon.

The smooth edge of the textile strip results from the fusion of the fill ends and, occasionally, not more than one of the warps; most desirably, the edge will not involve any warp for the majority of its length. The resulting fused edge of the strip will appear smooth and should preclude the yarns of the fill from disengaging themselves along the smooth edge. The fusion most conveniently results from the ultrasonic cutting of the strip in the direction of the warp yarns.

The precise configuration of the continuous edge formed on the cut fabric is controlled by various factors. These include the speed of traverse of the material past the sonic unit, the shape of the pressing element, or knife, the amount of ultrasonic energy applied, and the degree of cooling, both to the horn and above and below the fabric beyond the pressing element.

The making of the waistband interlining involves first weaving a fabric having not more than 42 warp yarns per inch and at least 30 fill yarns per inch. The fill yarns have a thermoplastic composition. The manufacturing then continues with the placement of a thermoplastic finishing on the woven fabric.

Lastly, the fabric undergoes an ultrasonic cutting along lines substantially parallel to the warp yarns. It should produce a fused edge from the ends of the fill yarns along the cuts and involve no more than one warp yarn.

A machine for producing waistband interlinings using the method of the invention suitably comprises one or a number of stationary pressing elements positioned above one or more horns connected to ultrasonic generators. The machine also comprises means for feeding the fabric between the pressing elements and horns, and means for drawing off cut fabric.

The machine is operated such that the molten thermoplastics material of the weft between each pressing element and associated horn forms a bead which "bridges" one monofilament in the weft to the next, and, on occasion, fuses also into the adjacent warp or wale.

Various shapes of pressing elements may be used, depending upon the precise configuration which is required for the continuous edge. Preferably the diameter of the edge will be no greater than the thickness of the fabric in order that no ridge will appear on the waistband shell fabric during garment wear.

The pressing elements are suitably made from steel and subjected to a hardening process. The horn of the ultrasonic generator is suitably manufactured from titanium and carbide-tipped steel.

DETAILED DESCRIPTION

Figure 1:
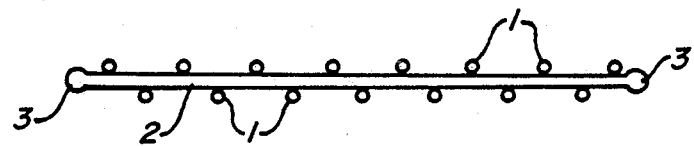
FIG. 1 is a cross-sectional elevation through an interlining strip of the invention, looking in the warp direction.

Referring to the drawings, an interlining fabric strip in accordance with the invention comprises the warp yarns 1 interwoven or knitted with the weft, or fill, yarns 2. The ends of the weft yarns 2 merge into the continuous edges 3.

Figure 2:
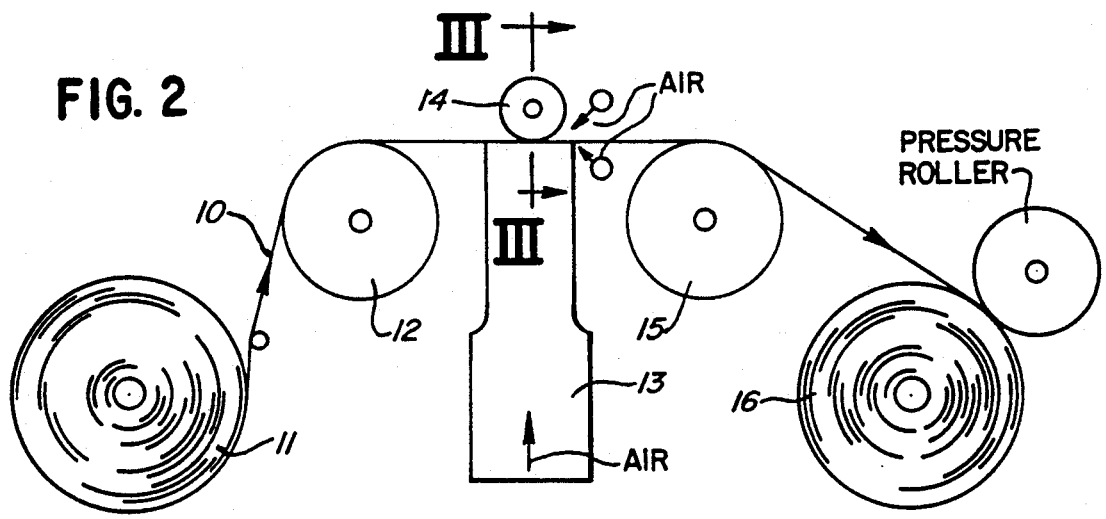
FIG. 2 shows one form of apparatus for the production of interlining strips from a full-width fabric.
Figure 3:
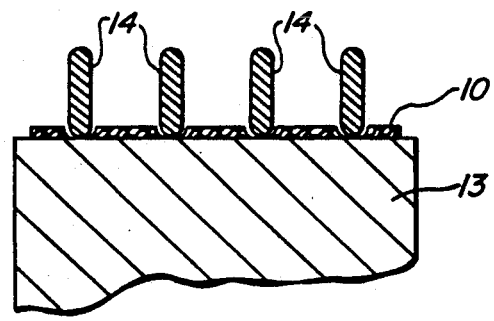
FIG. 3 is a section on the line III—III of FIG. 2.

Referring to FIG. 2, the full-width fabric 10 is fed from the feed-roller 11 around the guide-roller 12 and over the horn 13 of an ultrasonic generator operating at a frequency between 20 and 200 KHz, preferably 20 KHz. As the fabric passes over the top of the horn 13, it is pressed by a series of pressing/cutting elements, or knives, 14 which cause the thermoplastic material of the fill yarns which they engage to soften and, by virtue of the fact that the fabric is moving, to "smear" or merge into the following fills.

Cooling air, if necessary, is applied to the horn 13 and to the fabric 10 as it emerges from between the horn 13 and the pressing/cutting elements 14, in order rapidly to cool the continuous cut and fused edges 3 of the interlining strips. The strips are thereafter passed over a guide-roller 15 and wrapped around the take-up roll 16. A suitable machine to accomplish this objective may be obtained from the Bramson Sonic Power Company of Danbury, Conn., model 187P. This machine may run at 20 percent of its 1500 watt power to give 300 watts to the horn. The horn then may accommodate seven knives across its 7 to 9 inches. The actual amount of power may vary depending upon the width of the material and the actual number of knives but will generally fall in the range of 18 to 24 percent of the available power.

Figure 4:
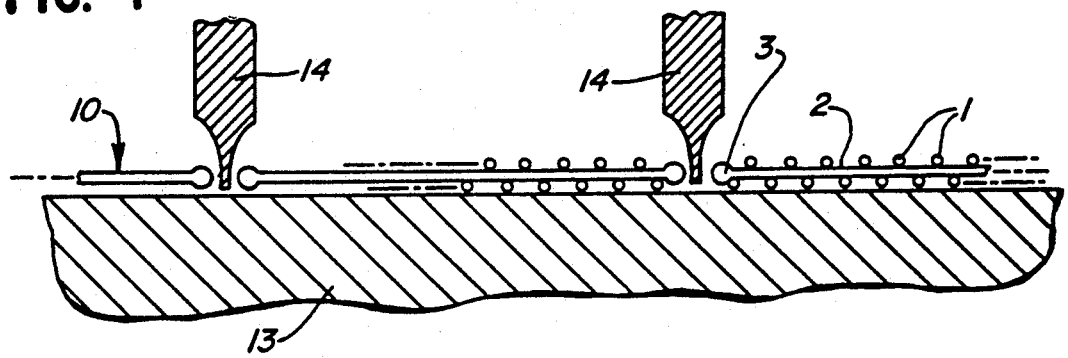
FIG. 4 shows part of FIG. 3 on an enlarged scale.
Figure 5:
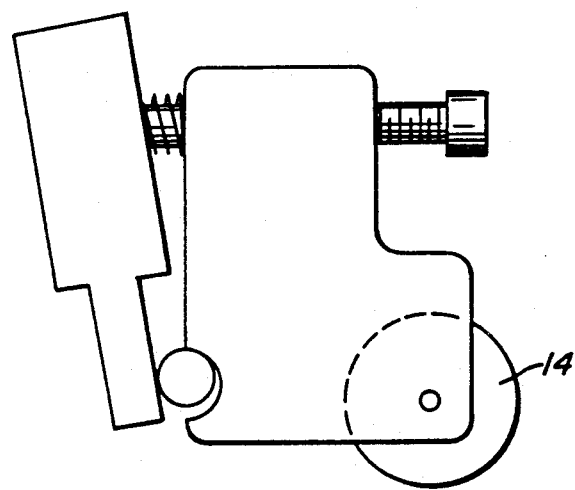
FIG. 5 shows one way of mounting the pressing elements, or knives.
Figure 6:
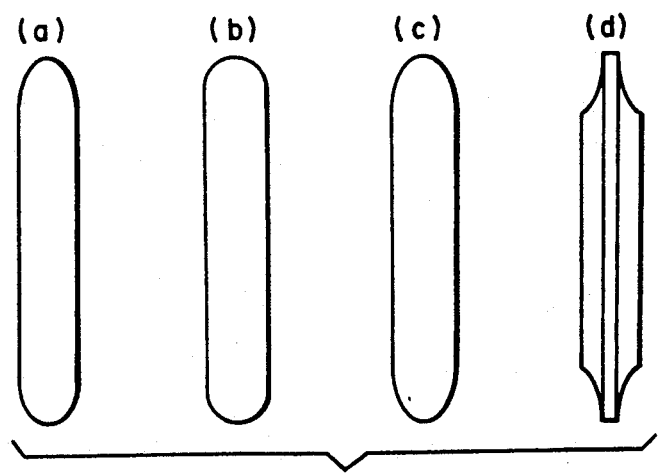
FIG. 6 shows a number of pressing element shapes.
Figure 7:
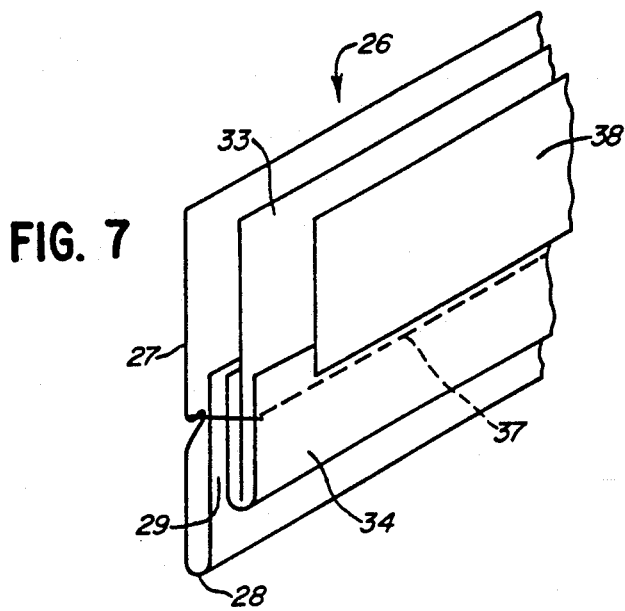
FIG. 7 gives a perspective view of a subassembly not yet attached to a shell fabric of a garment which utilizes a waistband interlining material with fused edges.

The operation of the pressing/cutting element 14 is best seen in FIG. 4. The element 14, which, as shown, is in the form of a disc, is preferably pivotally mounted, as shown in FIG. 5, in order to exert a uniform pressure on the fabric 10. Fine control is possible when the spring is under the control of a pneumatic cylinder. The element 14 may have any desired shape, which is dependent on the desired configuration of the continuous edge 3. A selection of typical element shapes is shown in FIG. 6. The cutting element shown in FIG. 6(d) is in the form of a hollow ground "blade". Typically, the pressing/cutting elements have "knife edges" of angle 75, 90, 120, or 140 degrees. A knife edge of 110 degrees having a flat spot on its bottom of 0.007 to 0.008 inch gives excellent results.

Typical operating speeds (i.e. feed and draw-off speeds) are 10 m/minute for 400 denier woven fabric and 420 denier knitted fabric, and 16 m/minute for 250 for denier knitted fabric. A very pleasing waistband interlining results from the use of a fabric having polyester polyfilament yarns of a size 20.5/1 as the warp and either 750 Denier monofilament polyester or 520 Denier monofilament nylon as the fills. In either event, the material may have 40 warps per inch and 33 fills per inch. Passing through the machine described above with the 110 degree knife, the material should travel at the rate of about 12 yards per minute.

The waistband subassembly shown generally at 26 in FIGS. 7 to 10 includes first the top 27 of the waistband which the consumer will see when he looks inside his garment. Formed from the same material and sitting below the top 27, the pleat 28 forms the recess 29 where the tops of pockets and the sewing of belt-tabs on the outside of the garment may occur. The pleat 28 serves to keep the interior of the garment attractive for the purchaser. The usual pocketing type of material functions well to form the top 27 and the pleat 28. In particular, it has a very acceptable feel to the touch.

Figure 8:
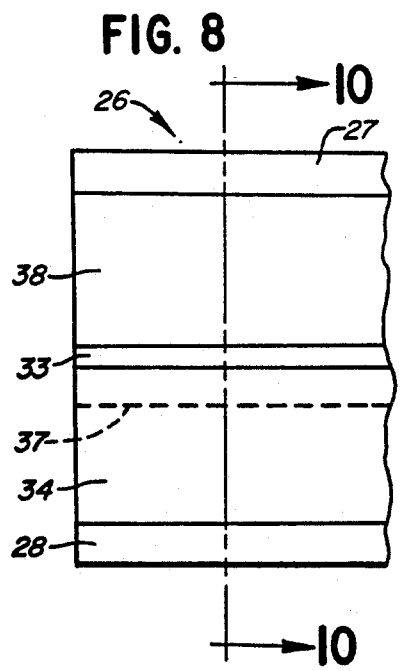
FIG. 8 displays, in elevational view, the subassembly with the waistband material of FIG. 7.
Figure 9:
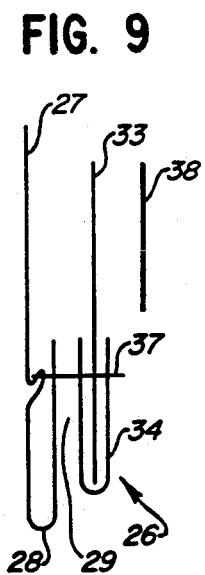
FIG. 9 gives a cross-sectional view along the line 9—9 of the subassembly with the waistband material of FIG. 8.
Figure 10:
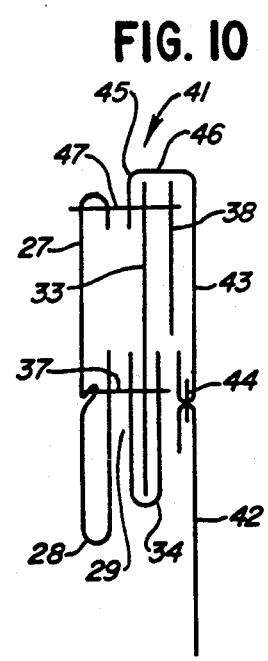
FIG. 10 shows a waistband assembly including a shell fabric and incorporating the subassembly and waistband material of FIGS. 7 to 9.

The subassembly 26 of FIGS. 8 to 10 further includes the strip of canvas 33. The canvas 33 provides the top of the garment as well as the subassembly with additional body.

The sewing tab 34 covers the bottom of the canvas strip 33. Along with the strip 33, it serves as an attachment point for the tops of pockets on the inside of the garment and for belt loops sewn to the outside of the garment.

The row of stitching 37 then serves to keep the subassembly 26, with one exception, substantially intact. The strip of waistband interlining 38 represents the sole component of the subassembly 26 remaining unattached to the others at this point in the construction process.

The completion of the waistband requires its attachment to a shell fabric. The completed assembly appears generally at 41 in FIG. 10. As seen there, the assembly at 41 includes the main body of the shell 42 which constitutes the vast majority of the garment visible to view. Additionally, the shell further includes the upper or edge portion 43 which encircles the wearer's waist. The line of stitching 44 attaches the two small sections together.

The very top 45 of the shell edge portion 43 folds over and towards the inside of the garment and covers the tops of the waistband interlining 38 and the canvas 33. Similarly, the top of the waistband 27 folds over to provide a smooth edge. The stitching 47 then serves to complete the construction of the waistband assembly 41 by passing through the top of the waistband twice, the folded over portion 46 of the upper shell section 43, the canvas 33, and the waistband interlining 38.

The waistband interlining material 38 represents a relatively stiff woven fabric sold widely throughout the United States and other countries under the trademark BANROL by Quick Service Textiles, Inc., of Chicago, Ill. To form the fused edge, the waistband interlining material 38 should include fill yarns of a thermoplastic material. Typically, it will have a composition of a relatively stiff thermoplastic monofilament yarn. The fill yarns may have a composition of nylon or polyester as typical examples and, in particular, take the form of 750 Denier spun polyester monofilament. The fill will generally incorporate about 30 or more yarns per inch. Preferred is 33 yarns.

The warp may possess a high thermoplastic content. In fact, the warp thread yarn may have a composition of only thermoplastic material. Polyester spun yarn represents a suitable choice for the warps. More specifically, the warp may include 15.5/1 one hundred percent polyester spun yarn. For 33 fills per inch, 20.5/1 is desirable.

The waistband interlining 38 should also include a finish applied to the warp and fill yarns. This finishing generally takes the form of a thermoplastic material applied to the yarns in the molten state and allowed to cool to hardness. In particular, an acrylic resin has proved to represent a desirable finish to the waistband interlining materials. A particularly desirable finish takes the form of an acrylic latex sold under the trademark Rophlex E693 by The Rohm & Hass Company in Philadelphia, Penn.

The thermoplastic finish seems to aid in the fusion of the ends of the fill yarns to form a solid edge as well as providing a more desired interlining material itself. It may accomplish this by effectuating a tempering of the yarns themselves because of the heat introduced by the application of the molten material to the yarns. Alternately, or even additionally, the finish may act as a sort of adhesive to help the fill ends fuse and form a solid mass and perhaps may contribute to that mass itself.

A smooth edge may result simply from the fusion of the ends of fill yarns by themselves. It may at times also incorporate in the fused mass no more than one warp yarn. Preferably the majority, if not all, of the fused edge includes no warps whatsoever.

By virtue of the method of this invention, it is possible to produce, in one operation, a waistband interlining strip having a flexible continuous thermoplastic edge which assists in the manufacture of garments and which provides protection against weft penetration of the waistband shell fabric throughout the life of the garment.

Accordingly, what is claimed is:

1. A waistband interlining material comprising an elongated web of resiliently stiff woven or knitted fabric having at least about 30 fill yarns of thermoplastic material per inch and no more than about 42 warp yarns per inch of a high thermoplastic content, said fabric having a substantial area between each of said fill yarns free of any fill yarn, said web being coated with a finishing of a thermoplastic material holding said fill and warp yarns together, at least one of the elongated edges forming a fused, smooth mass formed from the ends of said fill yarns along said at least one elongated edge and from not more than one of said warp yarns.

2. The material of claim 1 wherein said area between each of said fill yarns has a width at least about equal to the diameter of said fill yarns.

3. The material of claim 2 wherein the total area between said fill yarns occupies not less than about 60 percent of the area of said web.

4. The material of claim 3 wherein the total area between said fill yarns occupies not less than about 63 percent of the area of said web.

5. The interlining of claim 1 wherein said warp yarns are composed of a thermoplastic material.

6. The material of claim 5 wherein said finishing is composed of an acrylic resin.

7. The material of claim 6 wherein said fabric includes no more than 40 warp yarns per inch.

8. The material of claim 7 wherein said fabric includes at least about 33 fill yarns per inch.

9. The material of claim 8 wherein said fused mass, along the majority of said at least one edge, includes no warp yarns.

10. The material of claim 9 wherein said warp yarns are polyester polyfilaments.

11. The material of claim 10 wherein said fill yarns are polyester monofilaments.

12. The material of claim 10 wherein said fill yarns are nylon monofilaments.

13. The material of claim 10 wherein each of said elongated edges forms one of said fused, smooth masses.

14. A waistband assembly comprising:
(A) an inwardly folded shell fabric of a garment, and (B) a resilient, woven or knitted strip positioned within the fold of said shell fabric, said strip comprising an elongated web of resiliently stiff woven or knitted fabric having at least about 30 fill yarns of thermoplastic material per inch and no more than about 42 warp yarns per inch of a high thermoplastic content, said fabric having a substantial area between each of said fill yarns free of any fill yarn, said web being coated with a finishing of a thermoplastic material holding said fill and warp yarns together, at least one of the elongated edges forming a fused, smooth mass formed from the ends of said fill yarns along said at least one elongated edge and from not more than one of said warp yarns.

15. The material of claim 14 wherein said area between each of said fill yarns has a width at least about equal to the diameter of said fill yarns.

16. The material of claim 15 wherein the total area between said fill yarns occupies not less than about 60 percent of the area of said web.

17. The material of claim 16 wherein the total area between said fill yarns occupies not less than about 63 percent of the area of said web.

18. The assembly of claim 14 wherein said warp yarns are composed of a thermoplastic material.

19. The assembly of claim 18 wherein said finishing is composed of an acrylic resin.

20. The assembly of claim 19 wherein wherein said fabric includes no more than 40 warp yarns per inch.

21. The assembly of claim 20 wherein said fabric includes at least about 33 fill yarns per inch.

22. The assembly of claim 21 wherein said fused mass, along the majority of said at least one edge, includes no warp yarns.

23. The assembly of claim 22 wherein said warp yarns are polyester polyfilaments.

24. The assembly of claim 23 wherein said fill yarns are polyester monofilaments.

25. The assembly of claim 23 wherein wherein said fill yarns are nylon monofilaments.

26. The assembly of claim 25 wherein each of said elongated edges forms one of said fused, smooth masses.

27. A method of making a waistband interlining comprising:

(A) weaving or knitting a fabric having (a) not more than 42 warp yarns per inch and (b) at least 30 fill yarns per inch, said fill yarns having a thermoplastic composition, said fabric having a substantial area between each of said fill yarns free of any fill yarn;

(B) placing a thermoplastic composition on said fabric to hold said fill and warp yarns together; and (C) ultrasonically cutting said fabric with said finishing along lines substantially parallel to said warp yarns to produce a fused edge from the ends of said fill yarns along the cuts and no more than one of said warp yarns.

28. The material of claim 27 wherein said area between each of said fill yarns has a width at least about equal to the diameter of said fill yarns.

29. The material of claim 28 wherein the total area between said fill yarns occupies not less than about 60 percent of the area of said web.

30. The material of claim 29 wherein the total area between said fill yarns occupies not less than about 63 percent of the area of said web.

31. The method of claim 27 with the step of ultrasonically cutting said fabric is accomplished by passing said fabric through an ultrasonic cutter at the rate of about 12 yards per minute.

32. The method of claim 31 wherein said ultrasonic cutter has a knife edge angle of about 110 degrees.

33. The method of claim 32 wherein said ultrasonic cutter uses a power of about 300 watts.

34. The method of claim 33 wherein said warp yarns are composed of a thermoplastic material.

35. The method of claim 33 wherein said finishing is composed of an acrylic resin.

36. The method of claim 35 wherein said fabric includes no more than 40 warp yarns per inch.

37. The method of claim 36 wherein said fabric includes at least about 33 fill yarns per inch.

38. The method of claim 37 wherein said fused mass, along the majority of each of said edges, includes no warp yarns.

39. The method of claim 38 wherein said fill yarns are nylon monofilaments.

40. The method of claim 38 wherein said fill yarns are polyester monofilaments.

41. The method of claim 38 wherein the cutting edge of said knife includes a flat spot having a width of about 0.007 to 0.008 inches.

* * * * *